L. ALLEN.
Optical Lens.

No. 223,627.  Patented Jan. 20, 1880.

ATTEST:
Chas. M. Higgins
Patrick Martin

INVENTOR:
L. Allen
by J. H. Wales & Son
Attys

UNITED STATES PATENT OFFICE.

LEICESTER ALLEN, OF BROOKLYN, NEW YORK.

OPTICAL LENS.

SPECIFICATION forming part of Letters Patent No. 223,627, dated January 20, 1880.

Application filed June 28, 1879.

*To all whom it may concern:*

Be it known that I, LEICESTER ALLEN, of the city of Brooklyn, county of Kings, and State of New York, have invented an Improvement in Optical Glasses and Lenses; and I do hereby declare that the following is a full, clear, and exact description of the same, reference being had to the accompanying drawings, forming part of this specification.

My invention has for its object the production of optical glasses or lenses for use, more especially, as a protection for weak eyes from the effects of strong light and the heat which enters the eye with light, but which is equally efficacious for the protection of healthy eyes from the effects of direct and strong solar light or strong artificial light, such as the electric or calcium light, or from solar light reflected from white beach-sand or snow.

The invention may also be found applicable to lenses in philosophical apparatus for solar observations, where it is desirable to protect the eye from the strong light and heat, and possibly for other useful purposes.

The invention consists, partly, in the combination, with a lens or plane eyeglass, or glass employed for optical purposes, such as a prism or plate which forms a part or is intended to form a part of any optical instrument whatever, of a transparent or translucent film of metal cemented or superimposed upon its surface.

My invention consists, further, in a transparent protection for said transparent or translucent film of metal, in combination with the aforesaid optical glass or lens and transparent or translucent film of metal cemented or superimposed upon said glass or lens.

I further state that I mean to designate by the popular term "optical glass or lens" a lens or plate of any transparent material which may be useful for optical instruments, such as diamond, Iceland spar, porcelain, &c.

Figure 1:
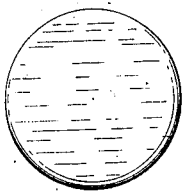
Figure 2:
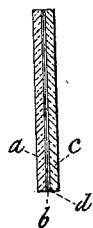

Figure 1 in the drawings represents a face view of a plane circular eyeglass constructed in accordance with my invention. Fig. 2 is a diametrical section of the same, $a$ representing the glass, $b$ the transparent or translucent metallic film cemented to or superimposed upon the surface of said glass, $c$ a transparent protection for said film, and $d$ a layer of transparent cement.

I prefer gold-leaf for the metallic film, but do not limit myself thereto, as I may use any metal whatever which will, by precipitation, form solution, or in the form of a precipitate or powder, or use in any manner, form a transparent or translucent film. Gold-leaf is, however, on account of the extremely soft greenish light transmitted through it and the facility in applying it, (which may be done by the ordinary method of gilding on glass,) preferred above any other metal or alloy now known to me.

The transparent protection $c$ may be a thick coat, $d$, of transparent varnish, preferably (if varnish only is employed for the purpose) Canada balsam or a solution of the same in alcohol; but I much prefer to make such protection of glass formed to fit the surface of the metallic film.

For ordinary eye-screens, both surfaces of such glass-protection may be planes, as shown in the drawings; but for other optical purposes the glass-protection may have one or both surfaces curved, to give any degree of refraction desired.

When a glass-protection, $c$, is used, it may be cemented to the plate $a$ by a layer, $d$, of Canada balsam or other transparent cement, or it may be simply superimposed and held mechanically.

Through a glass or lens of this description the various colors, slightly modified, of objects may be distinctly perceived; but the quantity of light transmitted is greatly reduced, while both obscure and luminous heat are intercepted. Applied to eyeglasses, the invention therefore affords a most comfortable and elegant screen for weak eyes and for the protection of healthy eyes, as aforesaid.

What I claim as my invention is—

1. The combination, with an optical glass or lens, of a transparent or translucent film of metal superimposed upon or attached to the glass or lens, substantially as and for the purpose set forth.

2. The combination of an optical glass or lens, a transparent film of metal superimposed upon or attached to said glass or lens, and a transparent protection placed over or attached to said film, substantially as and for the purpose specified.

3. The combination of an optical glass or lens, a film of gold cemented or attached to said glass or lens, and a protective coat of transparent varnish applied to the exterior surface of said film, substantially as and for the purpose set forth.

4. The combination of an optical glass or lens, a gold film attached thereto, and a glass protection for said film cemented to the same by Canada balsam, substantially as and for the purpose described.

LEICESTER ALLEN.

Witnesses:
　PATRICK MARTIN,
　JOHN E. GAVIN.